Oct. 12, 1948.　　　　D. R. WEBB　　　　2,451,263
POWER BOOST CONTROL SYSTEM
Filed July 3, 1947　　　　　　　　　　2 Sheets-Sheet 1

Inventor:
Donald R. Webb,
by　Claude A. Mott
His Attorney.

Oct. 12, 1948.    D. R. WEBB    2,451,263
POWER BOOST CONTROL SYSTEM
Filed July 3, 1947    2 Sheets-Sheet 2
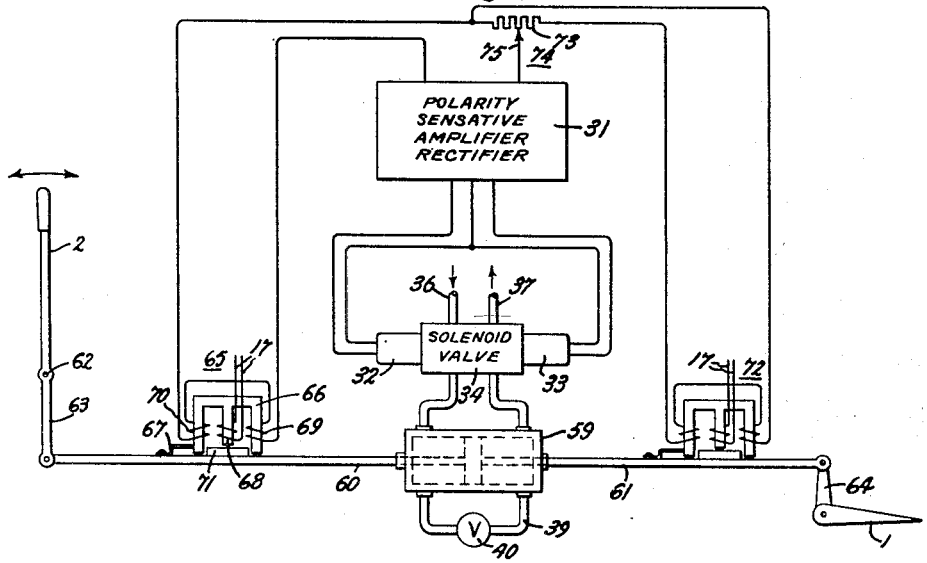
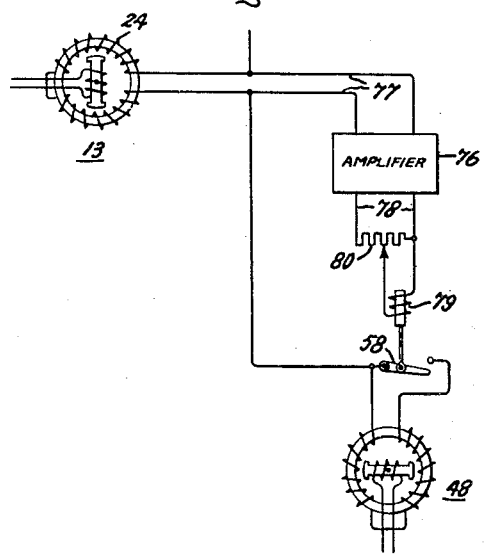
Inventor:
Donald R. Webb,
by Claude A. West
His Attorney.

Patented Oct. 12, 1948

2,451,263

UNITED STATES PATENT OFFICE 2,451,263

POWER BOOST CONTROL SYSTEM

Donald R. Webb, Schenectady, N. Y., assignor to General Electric Company, a corporation of New York Application July 3, 1947, Serial No. 758,791

17 Claims. (Cl. 121—41)

1

The present invention relates to control systems and more particularly to control systems of the type wherein a controlled object is positioned by a control device with force amplification. It is especially useful in connection with power boost and automatic pilot systems for aircraft and it is this application of my invention which I have elected to illustrate and discuss. It is to be understood, however, that this is only by way of example and that the invention may be used wherever found applicable.

The development of large size and high speed aircraft has resulted in the need for a force amplification apparatus, or power boost as it is usually called, to assist the pilot in operating the flight control surfaces of the aircraft. In power boost systems it is customary to feed back to the pilot's control lever a fractional part of the reactive force exerted on the control surface, in order to enable the pilot to "feel" the resistance of the control surface to displacement from the flight neutral position. It is desirable that the amount of force feedback or "feel" be easily adjustable in flight in order to obtain optimum ease of control under various flight conditions.

An object of the present invention is to provide an improved power boost system which is simple and inexpensive to manufacture.

Another object is to provide an electrically controlled power boost system having force feedback in which the amount of feedback may be easily changed by a simple electrical adjustment.

Another object is to provide a combined power boost and automatic pilot system for aircraft in which the power boost and automatic pilot have a number of common parts resulting in overall simplification and considerable saving in weight.

A further object is to provide an automatic pilot system in which force feedback stabilization is obtained with simple, reliable, and inexpensive equipment.

A still further object of the invention is to provide a power boost and automatic pilot system in which the pilot can more easily overpower the automatic pilot than in conventional systems now in use.

Further objects and advantages of the invention will become apparent and the invention will be better understood from the following description referring to the accompanying drawings, and the features of novelty which characterize the invention will be pointed out with particularity in the claims annexed to and forming a part of this specification.

In the drawing

2

Fig. 2 is a modification of the arrangement shown in Fig. 1, wherein different mechanical and electrical control elements are used.

Fig. 3 illustrates a supplementary automatic control feature which may be added to the system of Fig. 1.

Figure 1:
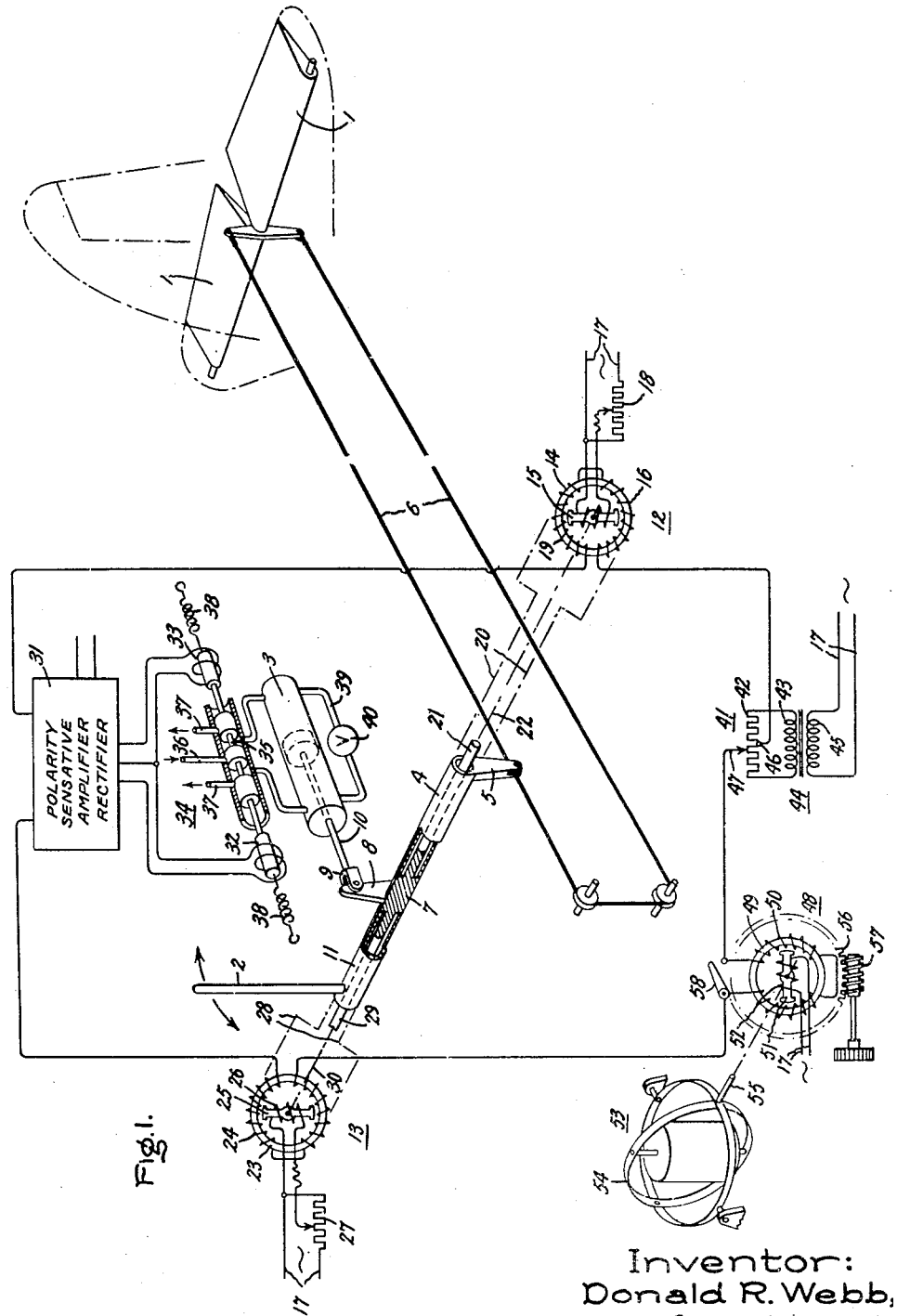
Fig. 1 is a schematic representation of a power boost system embodying my invention, the system being arranged to operate the elevator controls of an aircraft.

Referring to the drawing, my invention is shown embodied in a power boost and automatic pilot system for operating the elevators 1 of an aircraft. Force for the positioning of the elevators 1 during flight is supplied by both a pilot's control lever 2 and a hydraulic servomotor 3. The servomotor 3 is coupled to the elevators 1 by means of a first torque tube 4, the outer end of which carries a depending bell-crank 5 connected to a cable 6 which operates the elevators. The inner end of the torque tube 4 is secured to a central solid hub member 7 in any suitable manner as by welding or brazing. The hub 7 has projecting therefrom a torque arm 8 connected by means of a suitable yoke 9 to piston shaft 10 of the servomotor 3.

The pilot's control lever 2 is fastened to the outer end of a second torque tube 11, the inner end of which is attached to the central hub member 7 in any suitable manner, as by welding or brazing.

It will be noted from the drawing that the torque tubes 4 and 11 are coaxially arranged and are, in effect, connected in series relation through the central hub member 7. Thus during the manual operation of the elevators 1, when the pilot's lever 2 is moved to the left, the bell-crank 5 pivots counterclockwise causing the elevators to be deflected in a downward direction and when the pilot's lever is moved to the right the reverse action takes place, this controlling action being entirely conventional.

According to my invention a novel arrangement is provided for controlling the servomotor 3 in such a manner that it amplifies the force applied to the pilot's control lever 2 so that the pilot needs only to supply a fractional part of the total force required to operate the elevators 1. In general, this is accomplished by the provision of reversible polarity electric signal generators 12 and 13 which are connected to be actuated in accordance with the elastic deformation occurring in the torque tubes 4 and 11. The signal generators 12 and 13 are connected so that their differential output controls the direction of movement of the servomotor 3.

Referring now to the details of the control system, the electric signal generator 12 may be, as illustrated, a conventional Selsyn comprising an annular magnetic stator 14 and a magnetic salient-pole rotor 15. The rotor 15 carries an exciting winding 16 which is connected to alternating current supply leads 17 through a voltage-adjusting potentiometer 18. The stator 14 carries an output winding 19 connected as shown so that when the rotor is in the neutral position shown, the alternating current voltages induced in the winding 19 cancel out and the net voltage across the output leads of the winding is zero. When the rotor 15 is rotated in either direction from the neutral position shown, the stator winding 19 produces a net voltage, the magnitude of which varies in accordance with the amount of displacement and the polarity or direction of which varies in accordance with the direction of the displacement from neutral. The change in net stator voltage per degree of displacement of the rotor from neutral, i. e., the voltage gradient of the Selsyn, may be adjusted by means of the potentiometer 18.

In order that the stator and rotor of the signal generator 12 may be relatively displaced in accordance with the elastic deformation occurring in the torque tube 4, the stator 14 is mechanically connected to the outer end of the torque tube in any suitable manner (not shown), this connection being indicated by the dash lines 20. The rotor 15 of the signal generator 12 is maintained at a reference or datum position by connecting it to the outer end of a rod 21, this connection being indicated by the dash line 22. As will be noted from an inspection of the drawing the rod 21 is located within the hollow torque tube 4, the inner end of the rod being attached to or forming a part of the central hub member 7. With this arrangement it will be clear that whenever force is transmitted between the elevators 1 and the servomotor 3 through the linkage including the torque tube 4, the elastic deformation or twist of the torque tube will cause a corresponding rotation between the rotor and stator of the signal generator 12 and the voltage output of the signal generator will indicate by its magnitude polarity the amount and direction of the elastic deformation in the torque tube 4.

The electric signal generator 13 is similar to the previously described signal generator 12 and comprises a stator member 23 carrying a stator winding 24 and a rotor member 25 carrying a rotor winding 26. The rotor winding 26 is connected as shown to the common alternating supply leads 17 through a voltage-gradient adjusting potentiometer 27.

In order that the electric signal generator 13 may be actuated in accordance with the elastic deformation occurring in the torque tube 11, the stator 23 is mechanically connected by means (not shown) to the outer end of the torque tube 11 by any suitable mechanical connection indicated by the dash lines 28. For the purpose of maintaining the rotor member 25 at a reference or datum position, it is connected to the outer end of a rod 29, this connection being indicated by the dash line 30. The rod 29 lies within the hollow torque tube 11, the inner end of the rod being connected to or forming a part of the central hub member 7. With this arrangement it will be clear that whenever force is transmitted by the torque tube 11 between the servomotor torque arm 8 and the pilot control lever 2, the elastic deformation of the torque tube 11 will cause a corresponding relative rotation of the rotor and stator members of the electric signal generator 13, the magnitude and polarity of the output voltage of the signal generator being indicative of the amount and direction of the elastic deformation or twist of the torque tube 11.

The thickness and composition of the torque tubes 4 and 11 are selected such that the elastic deformations therein are suitable for operation of the signal generators 12 and 13. For proper operation, the torque tubes should be designed so that the elastic limit of the material is not exceeded under conditions of maximum stress encountered in operation. A torque tube material found to be suitable for use in the system illustrated is a steel alloy designated by the American Iron and Steel Institute as A-8630. Other materials may be used, depending on the design factors involved and the heat treatment used.

In order that the outputs of the signal generators 12 and 13 may be utilized to differentially control the direction of movement of the servomotor 3, they are connected in series circuit relation to the input of a polarity or phase sensitive amplifier rectifier 31. The amplifier 31 is a normally-balanced, direct-current-output type of known construction such as shown, for example, in Patent 2,416,097 Hansen et al. The amplifier, which is energized from the common alternating supply leads 17, supplies normally-balanced direct currents to differentially connected solenoids 32 and 33 which are used to operate a hydraulic control valve indicated generally at 34. The control valve 34 is of conventional construction and comprises a slide valve member 35 which directs hydraulic oil from a supply conduit 36 to either end of the servomotor 3, depending upon which direction the slide valve is displaced by the differentially acting solenoids 32 and 33 from the neutral center position shown, the discharge oil returning through drain connections 37. The operation of the amplifier 31 and control valve 34, which is described in detail in the above-mentioned Hansen et al. patent, is such that when the input signal to the amplifier is zero, the direct currents supplied to the solenoids 32 and 33 are equal and the valve member 35 occupies the center position shown, to which position the valve member is biased by means of springs 38. When an input voltage is supplied to the amplifier, the current supplied to the solenoids 32 and 33 becomes unbalanced causing a movement of the valve member 35 and a resulting displacement of the servomotor piston shaft 10 in a direction dependent upon the polarity of the amplifier input signal.

The servomotor 3 is a type which is hydraulically locked when the control valve 34 is in the neutral position shown. Therefore, to permit emergency manual operation a by-pass conduit 39 interconnecting opposite ends of the servo cylinder is provided which may be opened by means of a control valve 40 to unlock the servo cylinders. The valve 40 may be manually or automatically operated.

In order to initially adjust the neutral position of the elevators 1, there is introduced in series circuit relation with the signal generators 12 and 13 an adjustable bias voltage. For this purpose there is provided a center tap potentiometer 41 having a resistance element 42 energized by a secondary winding 43 of a transformer 44 having a primary winding 45 energized from the common alternating current supply leads 17. The resistance element 42 has a center tap 46 and an adjustable slider 47 which are connected in series circuit relation with the signal generators 12 and 13 as shown. By moving the potentiometer slider 47 in either direction from a center position opposite the fixed tap 46 an adjustable alternating current signal voltage of either polarity may be introduced into the signal circuit.

The power boost system thus far described has the advantage that with the provision of a small amount of additional equipment the system may be used as an automatic pilot for gyroscopically stabilizing the attitude of the aircraft in space. For such additional optional use there is provided another Selsyn signal generator indicated generally at 48 which may be similar to the previously described signal generators 12 and 13. The signal generator 48 comprises a stator member 49 carrying a stator winding 50 and a rotor member 51 carrying rotor excitation winding 52. The stator winding 50 is connected in series circuit relation with the signal generators 12 and 13, and the rotor winding 52 is energized from the common alternating current supply leads 17.

For the purpose of actuating the signal generator in accordance with pitch movements of the aircraft about an athwartship axis, there is provided a conventional bank and climb gyro indicated schematically at 53. As will be clearly understood by those skilled in the automatic pilot art, the gyro 53 is oriented on the aircraft in such a way that the position of a pitch gimbal 54 relative to the gyro case indicates the pitch attitude of the aircraft. Movement of the pitch gimbal 54 is transmitted to the rotor 51 of the signal generator 48 by means of a shaft connection 55. For the purpose of adjusting the zero voltage or datum position of the signal generator 48 the stator 49 may be mounted on a rotatable gear plate 56, the rotary position of which may be adjusted by a manually operated worm gear 57 arranged in meshing relation with the gear plate.

When manual operation only of the elevators 1 is desired the gyroscopically actuated signal generator 48 is disabled. For this purpose there is provided a short-circuiting switch 58 which, when closed, short circuits and thereby disables the signal generator 48.

The operation of the power boost system without automatic pilot control will now be described. To describe this operation it will be assumed that the short-circuited switch 58 is closed and that initially the signal generators 12 and 13 and the bias voltage potentiometer 41 are in the zero voltage position. For this condition the voltage input to the amplifier 31 is zero so that the valve 34 is centralized and the servomotor 3 is stationary. It will also be assumed that the elevators 1 are in a neutral position so that the aircraft is not turning about the pitch axis. If the pilot desires to depress the elevators 1 so as to place the aircraft in a dive, he pushes on the top of the control lever 2 in a direction tending to rotate it to the left, as viewed in Fig. 1. This action causes an elastic deformation of the torque tube 11 whereby the signal generator 13 produces a control voltage which is applied to the input of amplifier 31, resulting in a displacement of the control valve 34 and a movement of the hydraulic servomotor 3 to the left which is in a direction to aid the pilot in moving the lever 2. As a result of this action the bell crank 5 rotates counterclockwise and the elevators 1 are depressed. Due to the action of the airstream on the elevators 1 they tend to resist movement away from the flight neutral position and when they are so moved by the action of the servomotor 3 and the control lever 2 there is a reactive force which causes an elastic deformation or twist of the torque tube 4 proportional to the force exerted on the elevators. This elastic deformation of the torque tube 4 causes actuation of the signal generator 12 which produces a control voltage in opposition to that produced by the signal generator 13. When the elevators are depressed to a point where the voltage produced by the signal generator 12 is equal and opposite to that produced by the signal generator 13 the input voltage to the amplifier 31 returns to zero and movement of the servomotor 3 ceases. In this manner the force exerted on the elevators 1 is proportioned to the force exerted by the pilot on the control lever 2, and it will be clear that by applying a varying force to the control lever 2 the pilot can cause a corresponding and proportional force to be applied to the elevators 1. Furthermore, due to the fact that the torque tubes 11 and 4 are connected in series relation there is a force feedback or "feel" on the control lever 2 which is directly proportional to the force exerted on the elevators 1 to displace them from the flight neutral position.

If the pilot desires to restore the elevators to the neutral position he simply releases the control lever 2. Due to its elasticity the torque tube 11 then returns to its initial position in which the voltage output of the signal generator 13 is zero. A signal voltage of the reverse polarity is then applied to the input of the amplifier 31 by the signal generator 12 whereupon the control valve 34 moves in the opposite direction causing the shaft 10 of the servomotor 3 to move to the right, moving the elevators 1 towards the neutral position. When the elevators reach the neutral position there is no longer any reactive force exerted on the torque tube 4 which then, because of its elasticity, returns to its initial unstressed position whereupon the voltage output of the signal generator 12 returns to zero and the servomotor stops.

From the foregoing it will be clear that when the pilot control lever is displaced in the opposite direction to the right, the reverse action takes place and the elevators 1 are raised until the reactive force thereon is proportional to the force exerted on the pilot's control lever 2. Similarly when the pilot's control lever is released, the servomotor 3 causes the elevators and the control lever 2 to be restored to the center neutral position.

My system has the advantage that the force amplification provided by the power boost can be easily and quickly adjusted in flight by adjusting either or both of the voltage-gradient potentiometers 18 and 27. For example, if more power boost is desired, this can be accomplished by adjusting the potentiometer 27 in a direction to increase the exciting current flowing in the rotor winding 26 of the signal generator 13, whereupon the voltage gradient of this signal generator is increased. The same effect can be produced by adjusting the potentiometer 18 in a direction to decrease the excitation current flowing in the rotor winding 16 of the signal generator 12 whereby the voltage gradient of this signal generator is decreased. On the other hand, if it is desired to decrease the power boost of the system this can be accomplished either by adjusting the potentiometer 27 in a direction to decrease the voltage gradient of signal generator 13 or by adjusting the potentiometer 18 in a direction to increase the voltage gradient of the signal generator 12. In some cases it may be desirable to connect the potentiometers 18 and 27 together for operation by a common power boost adjustment lever. In such a case the connection would be such that the lever is rotated in a given direction, the voltage gradients of the generators 12 and 13 are varied in opposite directions.

In order to compensate for fore and aft weight shifting on the aircraft it is customary to provide some means to cause the elevators to seek an equilibrium position in which they are displaced from the flight neutral position so that the aircraft will be maintained on an even keel without application of corrective force to the pilot's control lever. Usually this is accomplished by the adjustment of supplemental control surfaces, known as trim tabs, which can be adjusted in the air stream in a direction to adjust the bias force on the elevators in either direction. With my improved power boost control system this trimming action can be accomplished in a simple manner without the use of trim tabs. Let it be assumed, for example, that a weight load on the aircraft is shifted toward the rear so that it is necessary to maintain the elevators 1 in a downwardly depressed position to keep the aircraft flying on an even keel. In my system this can be accomplished by adjustment of the potentiometer 41 so as to insert a bias voltage in the signal circuit of the amplifier. For the condition assumed the potentiometer 41 is adjusted in a direction to insert a bias voltage in the signal circuit which causes the servomotor 3 to operate in a direction to depress the elevators. When the elevators are depressed to a point where the reactive force causes the signal generator 12 to produce a voltage equal and opposite to that produced by the potentiometer 41, the controlling action stops and the elevators will remain in this depressed position without application of any force by the pilot to the control lever 2. By varying the amount and polarity of the voltage produced by the potentiometer 41, any desired amount of up or down elevator compensation may be obtained.

If the pilot desires to use the system as an automatic pilot with which the pitch attitude of the aircraft is gyroscopically stabilized about the pitch axis, he simply opens the switch 58 so as to render active the gyroscopically actuated signal generator 48. To describe such action it will be assumed that the signal generators 12, 13 and 48 are in the zero signal voltage position shown, and that the aircraft is flying on an even keel. If the pitch attitude of the aircraft deviates from the reference position, the gyroscope 54 actuates the signal generator 48 which applies a signal voltage to the amplifier 31 in a direction to cause the servomotor 3 to move the elevators in a direction to compensate for the deviation. For example, if the nose of the aircraft drops, the polarity of the signal produced by the signal generator 48 is such that the elevators are moved upwardly by the servomotor 3 to compensate for the dive condition as detected by the gyroscope.

In order to obtain stable automatic pilot operation, the displacement of the control surfaces should be in proportion to the deviation of the aircraft from the reference position. Furthermore, the deflection of the control surfaces for a given deviation of the aircraft should vary in accordance with the air speed in order to compensate for the different reaction forces exerted on the control surfaces at different speeds for a given displacement. This desired stabilization can be obtained by feeding back a stabilizing signal in opposition to the gyroscope signal which stabilizing signal is a function of the reactive force exerted on the control surface. Such a stabilizing signal may be referred to as a force feedback signal. My improved power boost system provides such a force feedback stabilizing signal automatically when used as an automatic pilot. Thus for the condition assumed in which the nose drops below the reference position, the elevators are moved upwardly by the servomotor 3. This upward movement of the elevators results in a reactive force causing elastic deformation of the torque tube 4 whereupon the signal generator 12 provides a stabilizing signal in opposition to that produced by the gyroscopically actuated signal generator 48, the signal produced by the signal generator 12 being, in effect, a force feedback type of stabilizing signal. In other words, the stabilizing signal produced by the signal generator 12 is a function of the reactive force exerted on the elevators by the air stream so that the displacement of the elevators is automatically varied in accordance with the speed of the aircraft to give optimum stabilization at all air speeds. During automatic pilot operation the displacement of the elevators for a given deviation from the reference pitch position can be conveniently adjusted by means of the potentiometer 18. For example, if a greater displacement of the elevators is required, this can be accomplished by adjusting the potentiometer 18 to decrease the voltage gradient of the signal generator 12 and vice versa.

During automatic pilot operation the pitch attitude of the aircraft maintained by the automatic pilot may be adjusted by shifting the position of the stator of the signal generator 48, for which adjustment the gear plate 56 and the manually operated worm drive 57 are provided. If the pilot desires to take over the controls at any time he may do so by opening switch 58 or he may simply apply force to the control lever 2 so that the resulting signal produced by the signal generator 13 overpowers the signal produced by the gyroscope actuated signal generator 48.

For the purpose of simplicity, I have illustrated my improved power boost and automatic pilot system as applied to only one control of an aircraft, i. e., the elevator control. Obviously, the system may be equally well applied to control the rudder and ailerons of the aircraft. In application of the system to the aileron control the bank and climb gyro is also used to measure banking movement of the aircraft and operate the associated signal generator corresponding to the generator 48. In applying the system to the rudder control a directional gyro may similarly be used.

With reference to the power boost aspect of my control system, application is obviously not limited to operation of the control surfaces of an aircraft as it may be used to position any load which offers resistance to displacement from a neutral position.

In Fig. 2 of the drawing I have shown a modified form of my power boost system utilizing a different type of servomotor and a different form of elastic deformation responsive signal generator. In this modification a double ended type of servomotor 59 is used which has piston shafts 60 and 61 extending from opposite ends thereof. The pilot control lever 2 is pivoted at 62 and has a depending extension 63 coupled to the piston shaft 60. The piston shaft 61 is coupled to a crank arm 64 which pivots the elevators 1. With this arrangement it will be clear that when the pilot control lever 2 is moved to the left the elevators are depressed and vice versa.

For the purpose of measuring the elastic deformation in the piston shaft 60 there is provided an electric signal generator 65 which is essentially a variable reluctance type of electric strain gage. The signal generator 65 comprises an E-shaped magnetic core member 66 which is fastened to the piston shaft 60 by means of a suitable bracket 67. The middle leg of the core carries an excitation winding 68 which is connected to the alternating current supply leads 17, while the outer legs carry series connected output windings 69 and 70 in which control signal voltages are induced. A magnetic flux distributing member 71 is mounted on the shaft 60 in such a manner that when the shaft 60 is in an unstressed condition, the flux distributor forms a part of two, parallel, equal-reluctance magnetic circuit paths through windings 69 and 70 so that the voltages induced in these windings are equal. The windings 69 and 70 are connected in series opposition so that for this condition the output of the signal generator is zero. When the piston shaft 60 is stressed in either tension or compression by application of control forces to the lever 2, the magnetic flux distributor 71 moves relative to the core 66 to unbalance the reluctance of the magnetic circuit paths through the output windings 69 and 70 so that an output signal is produced, the magnitude and polarity of which depend upon the amount and direction of the elastic deformation occurring in the piston shaft 60.

Mounted on the piston shaft 61 is a second electric signal generator 72 which is the same as the signal generator 65 previously described, this signal generator acting to produce an electric signal voltage the magnitude and phase of which indicates the amount and direction of the elastic deformation occurring in the piston shaft 61.

In this modification the output of the signal generator 72 is connected directly across a resistance element 73 of a boost-ratio control potentiometer 74. The potentiometer 74 has a voltage dividing slider 75 by means of which an adjustable portion of the feedback voltage from the signal generator 72 may be connected in series opposition with the signal voltage produced by the signal generator 65 to control the amplifier 31.

In operation movement of the pilot control lever 2 from the neutral position stresses the piston shaft 60 of the servomotor 59 causing the signal generator 65 to produce a voltage which, when applied to the input of the amplifier 31, causes the servomotor piston to move in a direction to aid the movement of the control lever. At the same time the servo piston shaft 61 moves the elevators away from the neutral position whereupon the shaft is stressed and the signal generator 72 produces an output voltage in opposition to that produced by the signal generator 65. In this manner, as in the arrangement disclosed in Fig. 1, the force delivered by the servomotor is controlled so that it is directly proportional to the force exerted on the pilot control lever 2. By adjustment of the potentiometer 74 any desired power boost ratio may be obtained.

The electric signal generators used in my invention are essentially strain gages arranged to produce signal E. M. F.'s which indicate by their polarity and magnitude the direction and amount of elastic deformation measured. Thus it will now be clear that other types of strain gages may be used, such as, for example, those which make use of the change in resistance of a fine wire which stretches or compresses with a member whose elastic deformation is being measured.

In Fig. 3 of the drawing there is shown an additional control which may be added to my power boost system for the purpose of automatically operating the switch 58 which disables the automatic pilot signal generator 48 in the system of Fig. 1. For this purpose there may be provided a voltage amplifier 76 having input leads 77 connected directly across the output of winding 24 of the signal generator 13. Output leads 78 of amplifier 76 are connected to a voltage-sensitive relay through a voltage adjusting potentiometer 80. The relay 79 is connected to close the disabling switch 58 when the relay picks up and open the switch when the relay drops out.

During automatic pilot operation, the pilot does not actuate lever 2 and the voltage output of signal generator 13 is zero. Relay 79, therefore, is deenergized and switch 58 remains open, permitting the gyroscopically actuated signal generator 48 to control the elevators 1 as previously described in connection with Fig. 1.

With this arrangement, when the pilot desires to overpower the automatic pilot and assume manual control, he merely applies a control force to the lever 2. This causes a voltage to appear across the output winding 24 of signal generator 13, which voltage is amplified by amplifier 76 and causes relay 79 to pick up closing switch 58 and disabling the automatic pilot. By means of potentiometer 80, the amount of control force required to cause switch 58 to close can be adjusted to any desired value. This arrangement gives the added advantage of adjustable overpower forces which may be extremely light and which are entirely independent of the operating force exerted on the controls by the automatic pilot.

In view of the foregoing it will be clear that I have provided a novel power boost system which is highly flexible and has few moving parts so that it can be manufactured at low cost. Since the boost ratio is adjusted electrically, the ratio control element may be mounted in any location convenient to the operator without need for extended mechanical couplings. Furthermore, since the amplifier, control valve, and servomotor used are similar to those now used in many automatic pilot systems, the power boost feature may be added at a relatively small cost. Looking at it in another way, if the power boost system of my invention is installed in an aircraft, automatic pilot control may be added simply by connecting in the signal circuit an additional gyroscopically-actuated, signal generator. When used as an automatic pilot, the system provides force feedback stabilization without the need for complicated hydraulic equipment previously used for this purpose.

It will also be noted that with my power boost system there is a continuous mechanical linkage between the manual control member and the controlled object in which no lost motion is required to achieve power boost operation since the elastic deformation required to actuate signal generators 12 and 13 needs to be no greater than that normally encountered in conventional connecting linkages.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In a control system for actuating a controlled object by a control device with force amplification, an elastic linkage interconnecting said controlled object and said control device, a servomotor coupled to an intermediate part of said linkage for supplementing the control force applied by said control device, a first electric signal generator connected to respond to elastic deformation of said linkage between said control device and the servomotor connection, a second electric signal generator connected to respond to elastic deformation of said linkage between the servomotor connection and said controlled object, and an electro-responsive device responsive to the differential output of said signal generators for controlling said servomotor.

2. A control system comprising a control device, a servomotor, an elastic link interconnecting said servomotor and a load to be actuated, means responsive to movement of said control device for producing a first control signal voltage, means responsive to deformation of said elastic link for producing a second control signal voltage, means for algebraically adding said first and second control voltages to produce a resultant voltage and means for controlling said servomotor in accordance with said resultant voltage.

3. In a power-boost system, a manually operated control device, a controlled object, a force transmitting connection interconnecting said control device and controlled object arranged to permit actuation of the controlled object by the control member, a servomotor connected to said force transmitting connection between said control device and said controlled object, means responsive to elastic deformation of said force transmitting connection between the servomotor connection and the control device for causing said servomotor to move in a direction to assist movement of said control member, and means responsive to elastic deformation of said force transmitting connection between the servomotor and the controlled object for limiting the assisting force delivered by the servomotor to an amount proportional to the force exerted on said control device.

4. In a power-boost control system, a reversible servomotor, a control device, a controlled object, a first mechanical link interconnecting said control device and said servomotor, a second mechanical link interconnecting said servomotor and said controlled object, said first link being subject to elastic deformation when a force is applied to said control device and said second link being subject to elastic deformation when said servomotor applies a force to said controlled object, means for providing a first E. M. F. variable in magnitude and polarity in accordance with the amount and direction of the elastic deformation in said first link, means for providing a second E. M. F. variable in magnitude and polarity with the amount and direction of the elastic deformation in said second link, and means for controlling the direction of movement of said servomotor in accordance with the algebraic sum of said first and second E. M. F.'s.

5. In a power-boost system, a rotatable control lever, a rotatable controlled object providing resistance against rotation in either direction from a neutral position, a torque tube interconnecting said lever and object, a reversible servomotor connected to apply torque to an intermediate part of said torque tube, a first signal generator responsive to elastic deformation of said torque tube between the servomotor connection and said control lever for producing a signal voltage variable in polarity and magnitude in accordance with the direction and amount of the deformation, a second signal generator responsive to the elastic deformation of said torque tube between the servomotor connection and said controlled object for producing a signal voltage variable in polarity and magnitude in accordance with the direction and amount of the deformation, and an electro-responsive device controlled jointly by said first and second signal generators for controlling the direction of movement of said servomotor.

6. In a power-boost control system, a control device, a controlled object, a mechanical linkage coupling said controlled object to said control device, said linkage being subject to elastic deformation when force is transmitted thereby between said control device to said controlled object, and power-boost means for assisting the actuation of said controlled object by said control device, said power-boost means comprising a servomotor coupled to said linkage between said control device and said controlled object, means for measuring the direction and amount of elastic deformation between said control device and said servomotor and between said servomotor and said controlled object, means for converting said measured deformations into electric signals the magnitude and direction of which varies in accordance with the amount and direction of the measured deformations, and means for controlling the direction of movement of said servomotor in accordance with the algebraic sum of said electric signals.

7. In a power-boost control system, a control device, a controlled object, a mechanical linkage coupling said controlled object to said control device, said linkage being subject to elastic deformation when force is transmitted thereby between said control device to said controlled object, and power-boost means for assisting the actuation of said controlled object by said control device, said power boost means comprising a servomotor coupled to said linkage between said control device and said controlled object, a pair of electric signal generators each having an output the magnitude and polarity of which is variable in accordance with the amount and direction of movement of a control member from a neutral position, coupling means for actuating the control member of one of said signal generators in accordance with the elastic deformation occurring between said control device and said servomotor, coupling means for actuating the control member of the other of said signal generators in accordance with elastic deformation occurring between said servomotor and said controlled object, and an electro-responsive control device connected to control the direction of movement of said servomotor, said electro-responsive device being con- 8. In a control system for actuating a controlled object by a control device with force amplification, an elastic linkage interconnecting said controlled object and said control device, a servomotor coupled to an intermediate part of said linkage for supplementing the control force applied by said control device, a first electric signal generator connected to respond to elastic deformation of said linkage between said control device and the servomotor connection, a second electric signal generator connected to respond to elastic deformation of said linkage between the servomotor connection and said controlled object, an electro-responsive device responsive to the differential output of said signal generators for controlling said servomotor, and mean for varying the voltage gradient of one of said signal generators to adjust the force amplification factor of said system.

9. In a control system for actuating a controlled object by a control device with force amplification, an elastic linkage interconnecting said controlled object and said control device, a servomotor coupled to an intermediate part of said linkage for supplementing the control force applied by said control device, a first electric signal generator connected to respond to elastic deformation of said linkage between said control device and the servomotor connection, a second electric signal generator connected to respond to elastic deformation of said linkage between the servomotor connection and said controlled object, an electro-responsive device responsive to the differential output of said signal generators for controlling said servomotor, and means for varying the relative voltage gradients of said signal generators to adjust the amplification factor of said system.

10. A control system for actuating a load in accordance with movement of a control device comprising a servomotor, a mechanical connection for transmitting operating force between said servomotor and said load, said connection being subject to elastic deformation when force is applied thereto, an electric signal generator actuated by said control device for producing a first reversible direction control voltage, an electric signal generator actuated in accordance with the elastic deformation of said mechanical connection for producing a second reversible direction control voltage, and a direction-sensitive electro-responsive device connected to be responsive to the resultant of said first and second control voltages for controlling the direction of movement of said servomotor.

11. In a control system for actuating a controlled object by a control device with force amplification, an elastic linkage interconnecting said controlled object and said control device, a servomotor coupled to an intermediate part of said linkage for supplementing the control force applied by said control device, a first electric signal generator connected to respond to elastic deformation of said linkage between said control device and the servomotor connection, a second electric signal generator connected to respond to elastic deformation of said linkage between the servomotor connection and said controlled object, a third signal generator for providing an adjustable bias voltage, an electro-responsive device responsive to the combined outputs of said signal generators for controlling said servomotor and means for adjusting the output of said third signal generator to vary the neutral position of said controlled object.

12. A control system for actuating a load in accordance with movement of a control device comprising a servomotor, a mechanical connection for transmitting operating force between said servomotor and said load, said connection being subject to elastic deformation when force is applied thereto, an electric signal generator actuated by said control device for producing a first reversible polarity control voltage, an electric signal generator actuated in accordance with the elastic deformation of said mechanical connection for producing a second reversible polarity control voltage, a third signal generator for providing a reversible polarity bias voltage, an electro-responsive device responsive to the combined outputs of said signal generators for controlling said servomotor and means for adjusting the output of said third signal generator to vary the equilibrium position of said load.

13. In a control system for operating a control surface of an aircraft, a servomotor, an elastic linkage interconnecting said control surface and said servomotor, a first electric signal generator adapted to be actuated by a gyroscope, a second electric signal generator arranged to be actuated in accordance with the elastic deformation of said linkage when force is transmitted thereby between said control surface and said servomotor, and an electric-responsive device responsive to the differential output of said signal generators for controlling said servomotor.

14. In a control system for operating a control surface of an aircraft, a servomotor, an elastic linkage interconnecting said control surface and said servomotor, a first electric signal generator adapted to be actuated by a gyroscope, a second electric signal generator arranged to be actuated in accordance with the elastic deformation of said linkage when force is transmitted thereby between said control surface and said servomotor, a control device coupled to said servomotor by a second elastic linkage, a third signal generator actuated in accordance with the elastic deformation of said second linkage, and an electro-responsive device responsive to the combined outputs of said signal generators for controlling said servomotor.

15. In a control system for operating a control surface of an aircraft, a servomotor, an elastic linkage interconnecting said control surface and said servomotor, a first electric signal generator adapted to be actuated by a gyroscope, a second electric signal generator arranged to be actuated in accordance with the elastic deformation of said linkage when force is transmitted thereby between said control surface and said servomotor, a control device coupled to said servomotor by a second elastic linkage, a third signal generator actuated in accordance with the elastic deformation of said second linkage, an electro-responsive device responsive to the combined outputs of said signal generators for controlling said servomotor, and switching means arranged to selectively disable said first signal generator to permit switching between gyroscope control and manual control of said control surface.

16. In a control system for operating a control surface of an aircraft, a servomotor, an elastic linkage interconnecting said control surface and said servomotor, a first electric signal generator adapted to be actuated by a gyroscope, a second electric signal generator arranged to be actuated in accordance with the elastic deformation of said linkage when force is transmitted thereby between said control surface and said servomotor, a control device coupled to said servomotor by a second elastic linkage, a third signal generator actuated in accordance with the elastic deformation of said second linkage, an electroresponsive device responsive to the combined outputs of said signal generators for controlling said servomotor, switching means operative to disable said first signal generator, and means responsive to a predetermined output of said third signal generator for disabling said first signal generator.

17. A control system for actuating a load in accordance with movement of a control device comprising a servomotor, a mechanical connection for transmitting operating force between said servomotor and said load, said connection being subject to elastic deformation when force is applied thereto, an electric signal generator actuated by said control device for producing a first reversible polarity control voltage, an electric signal generator actuated in accordance with the elastic deformation of said mechanical connection for producing a second reversible polarity control voltage, an electroresponsive device responsive to the combined outputs of said signal generators for controlling said servomotor and means for adjusting the voltage gradient of one of said signal generators.

DONALD R. WEBB.

REFERENCES CITED

The following references are of record in the file of this patent:

UNITED STATES PATENTS

| Number | Name | Date |
|---|---|---|
| 2,408,770 | Frische | Oct. 8, 1946 |

Disclaimer 2,451,263.—*Donald R. Webb*, Schenectady, N. Y. POWER BOOST CONTROL SYSTEM. Patent dated Oct. 12, 1948. Disclaimer filed Aug. 23, 1949, by the assignee, *General Electric Company*.

Hereby enters this disclaimer to claims 2, 10, 13, and 17 of said patent.

[*Official Gazette Sept. 27, 1949.*]